(12) United States Patent
Huang et al.

(10) Patent No.: US 7,301,679 B2
(45) Date of Patent: Nov. 27, 2007

(54) CHANGEABLE MEANS FOR DIFFERENT TOTAL TRACKS AND ITS METHOD

(76) Inventors: Yin-Chun Huang, 6F, No. 72-11, Ln. 531, Kuang Fu Rd., Hsinchu (TW); Chih-Wen Huang, 3F, No. 13, Aly. 3, Ln. 33, Kuan Kou St., Hsiang Shan District, Hsinchu (TW)

( * ) Notice: Subject to any disclaimer, the term of this patent is extended or adjusted under 35 U.S.C. 154(b) by 754 days.

(21) Appl. No.: 10/174,920

(22) Filed: Jun. 19, 2002

(65) Prior Publication Data

US 2003/0058489 A1 Mar. 27, 2003

(30) Foreign Application Priority Data

Sep. 25, 2001 (TW) .............................. 90123517 A

(51) Int. Cl.
*H04N 1/04* (2006.01)
(52) U.S. Cl. ...................... 358/475; 358/474; 358/483; 358/497
(58) Field of Classification Search ................ 358/475, 358/484, 482, 483, 474, 497, 494, 496, 471, 358/487, 509, 505, 506, 512–514; 359/850, 359/861, 857, 833, 877, 872; 250/234–236, 250/208.1, 216, 227.14; 382/312
See application file for complete search history.

(56) References Cited

U.S. PATENT DOCUMENTS

| | | | | |
|---|---|---|---|---|
| 5,619,346 A | * | 4/1997 | Powers | 358/505 |
| 5,845,019 A | * | 12/1998 | Yoshizawa et al. | 382/312 |
| 6,081,363 A | * | 6/2000 | Shen et al. | 359/196 |
| 6,124,952 A | * | 9/2000 | Shieh et al. | 358/475 |
| 6,134,978 A | * | 10/2000 | Lin | 74/89.22 |
| 6,266,175 B1 | * | 7/2001 | McQueen | 359/216 |
| 6,421,158 B1 | * | 7/2002 | Yeh | 359/212 |
| 6,481,860 B1 | * | 11/2002 | Chang | 359/867 |
| 6,507,416 B1 | * | 1/2003 | Tang | 358/475 |
| 6,619,807 B2 | * | 9/2003 | Fang | 359/850 |
| 6,762,861 B2 | * | 7/2004 | Lan | 358/475 |

* cited by examiner

*Primary Examiner*—Cheukfan Lee
(74) *Attorney, Agent, or Firm*—Berkeley Law & Technology Group, LLP

(57) ABSTRACT

In one embodiment, at least one rotational reflection element is circulated such that one or more reflection surface sets is positioned along an optical path of a scanner. Circulation is provided by rotating a fixing element that is coupled to the rotational reflection element. The fixing element may comprise a power source and a fixing pin, whereinthe fixing pin is operable to fix a position of the rotational reflection element.

13 Claims, 10 Drawing Sheets

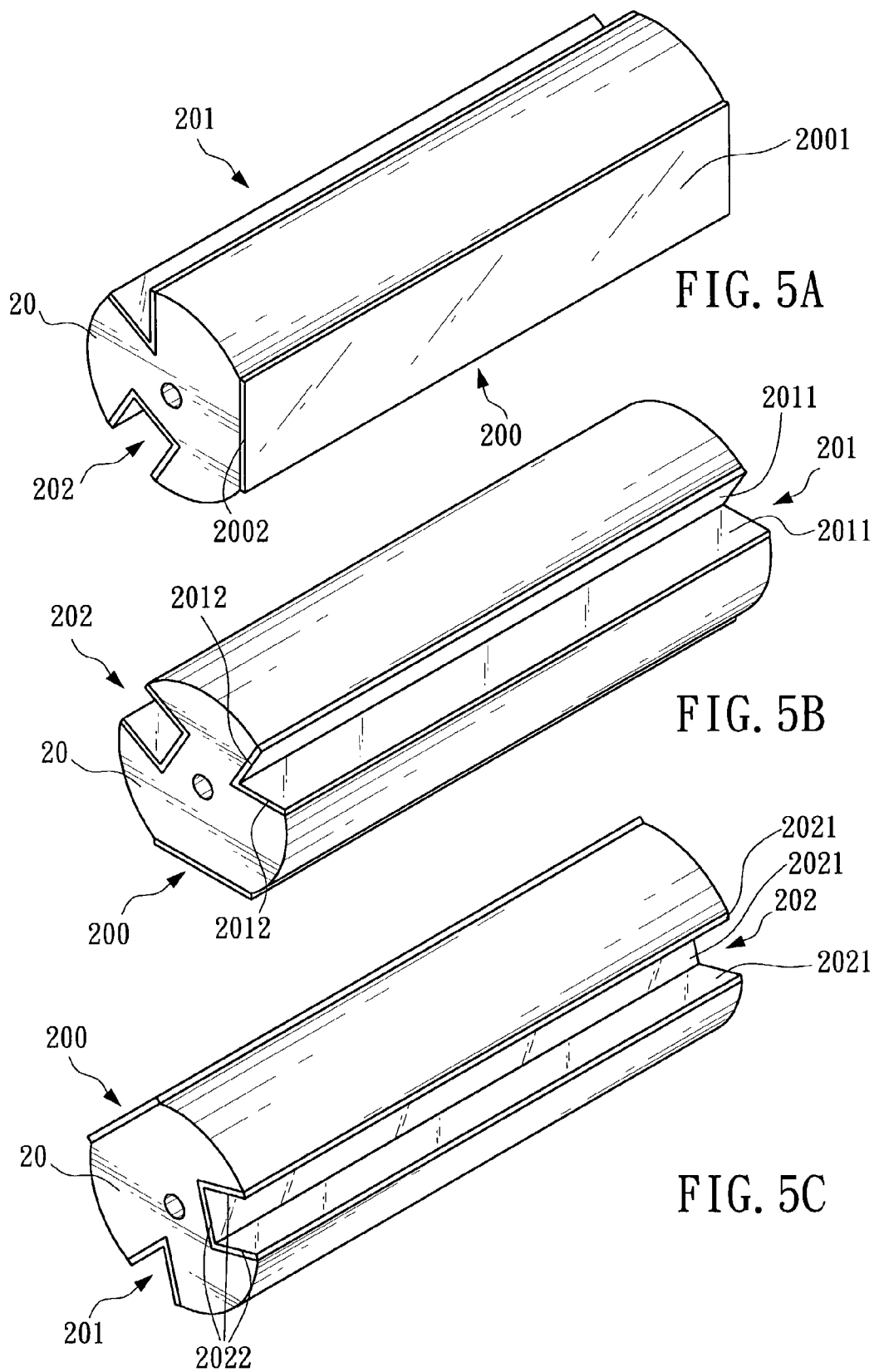

CHANGEABLE MEANS FOR DIFFERENT TOTAL TRACKS AND ITS METHOD

FIELD OF THE INVENTION

Embodiments of the present invention include a changeable apparatus for different total tracks and a corresponding method, a light-guide means applied to optical scanning apparatus and one or more rotational reflection elements. Embodiments of the present invention may be convenient for manufacturing, assembling and different total tracks.

BACKGROUND OF THE INVENTION

Please refer to FIG. 1, which is a prior art of an optical scanner of flat bed. A document window glass 12 is on a case 11 of optical scanner 1 for loading a document (not shown in figure) to be scanned. A driving device 13 drives an optical chassis 14 to linearly move along a guiding rod 15 in said case 11 for scanning said document to be scanned on said document window glass 12.

Please refer to FIG. 2, which is a sectional view of A—A section of said optical chassis 14. Optical chassis 14 comprises a hollow case 14, a light source 142 positioned a suitable position on a side of said hollow case 141, a light-guide means assembled by plural leaf springs 146 and plural reflection mirrors 143, a lens set 144 and a CCD 145. Said light source 142 emits a light to document on document window glass 12, the light continuously goes into said hollow case 141 of optical chassis 14, and plural reflection mirrors 143 of said light-guide means reflect the coming light to extend a length of the reflected light, another call is optical length; finally said lens set 144 focuses and forms the reflected light in said CCD 145 and CCD 145 transfers the focused and formed light to electronic signals.

There are two tremendous shortcomings on the light-guide means of the prior optical chassis 14 shown in FIGS. 1 and 2, one of them is a value for a total track for CCD 144 clearly focusing and forming an image is fixed (shown as a total value of Y1+Y2+Y3+Y4+Y5 in FIG. 2); another is any one of plural reflection mirrors is installed on a wrong position to easily cause an incorrect reflection angle, thus scanning quality is low and such mirror cannot be adjusted to correct the angle.

The current light-guide means in marketing generally has following inconvenient conditions: the first, inaccuracy of wrong angles causes low scanning quality; the second, remodeling different structures for different solutions, optical chassis dimensions, scanning dimensions (ex. A3, A4, etc.) or other total tracks, and above conditions are not suitable to the present economical and efficient society.

Embodiments of the present application improve upon the issues described above.

SUMMARY OF THE INVENTION

The first object is to offer a changeable apparatus for different total tracks and a corresponding method. The apparatus comprises: plural reflection elements and at least one rotational reflection element, wherein said rotational reflection element has different reflection surface sets to be rotated for different total tracks, such that different total tracks can be changed without altering dimensions of a light-guide means.

The second object is to offer a changeable means for different total tracks and its method for fine tuning a light path. The means having at least one rotational reflection element, said rotational reflection element having different reflection surface sets, wherein each reflection surface set has a total track different than other reflection surface sets. The rotational reflection element can be fine tuned by adjusting an angle between a reflection surface set and its reflection path.

Preferably, the present invention offers a changeable means for different total tracks and its method, comprising: plural reflection elements, at least one reflection element which is a rotational reflection element, which includes plural reflection surface sets, and each reflection surface set having at least one reflection surface Wherein the reflection element has a pivot axis for circulating and changing reflection surface sets and a fixing apparatus, which connects to the rotational reflection element for adjusting and fixing a position of the rotational reflection element.

Preferably, the fixing apparatus of the rotational reflection element comprises: a power source and a transmission, an end of said transmission connects to the rotational reflection element and another end of the transmission connects to said power source, thus the fixing apparatus transfers power from the power source to the rotational reflection element.

Preferably, no matter how many reflection surface sets of the rotational reflection element, directions and positions of reflection surfaces of an ejective light and an incident light are totally same.

The appended drawings will provide further illustration of the present invention, together with description; serve to explain the principles of the invention.

BRIEF DESCRIPTION OF THE DRAWINGS

FIG. 5A is a first preferred embodiment of a reflection surface set with one reflection surface of a rotational reflection element of the present invention.

FIG. 5B is a first preferred embodiment of a reflection surface set with two reflection surfaces of a rotational reflection element of the present invention.

FIG. 5C is a first preferred embodiment of a reflection surface set with three reflection surfaces of a rotational reflection element of the present invention.

DETAILED DESCRIPTION OF THE PRESENT INVENTION

A light-guide means 2 of the present invention comprises a plurality of reflection elements, at least one of the reflection elements is a rotational reflection element 20, which includes several reflection surface sets 200, 201 and 202 with different numbers of reflection surfaces 2001, 2011 and 2021 for different times of reflection. The rotational reflection element 20 is able to change reflection times and optical lengths of said light-guide means 2 via said reflection surface sets 200, 201 and 202 being individually rotated to a reflection position.

Following is several preferred embodiments for detail structures, motion types, functions and other features.

Figure 3:
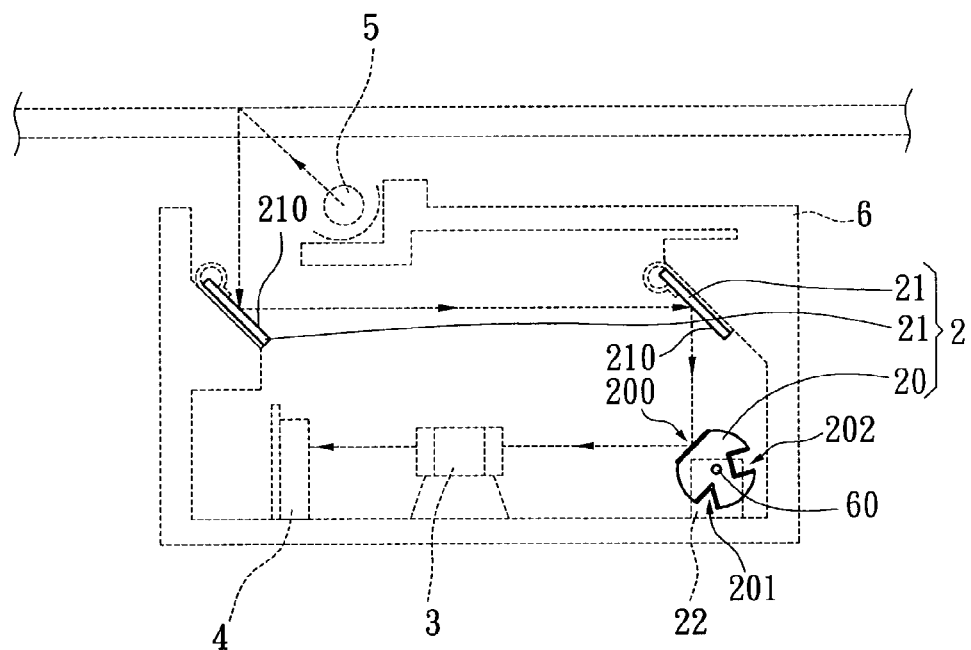
FIG. 3 is a preferred embodiment of the present invention installed on an optical chassis of an optical scanner.

Referring to FIG. 3, a preferred embodiment of the present invention may be installed on an optical chassis of an optical scanner. Wherein, a light-guide means 2, a lens set 3, a CCD 4, a light source 5 and an optical chassis case 6 are assembled to become an optical chassis 6 applied to an optical scanning device. The light-guide means 2 includes a plurality of reflection elements, and at least one of the reflection elements is a rotational reflection element 20. A pivot axis 60 on the optical chassis 6 is a rotating axis for the rotational reflection element 20 for circulating rotational reflection element 20 to any of three reflection surface sets 200, 201 and 202. Any other reflection elements 21 has a reflection surface 210 and the reflection elements 21 are a fixed type. The rotational reflection element 20 includes a fixing apparatus 22 for fixing and adjusting rotational positions of rotational reflection element 20. Rotational reflection element 20 can then be rotated to the reflection surface set 200, 201 or 202. Each of the reflection surface set cooperates with a corresponding reflection surface 210 of one of the fixed reflection elements 21 to offer direct functions of predetermined direction and optical length. It is not necessarily that designing a positioning apparatus or a clamping element to fix rotational reflection element 20 on or in optical chassis 6. Thus, the preferred embodiment addresses shortcomings of prior art.

Figure 4A:
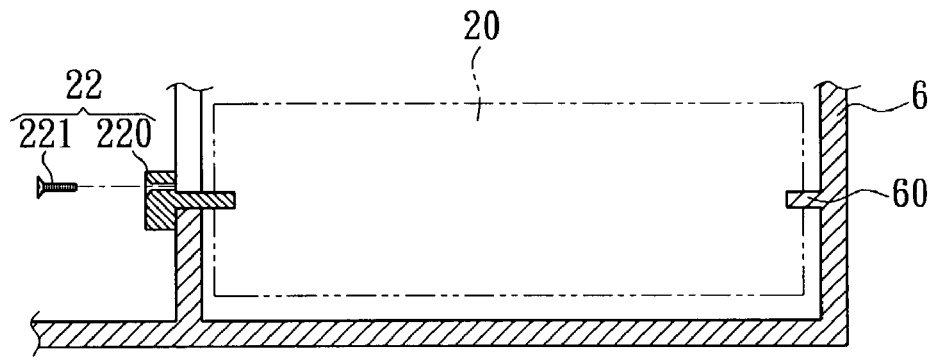
FIG. 4A is a first preferred embodiment of a fixing apparatus of the present invention.
Figure 4B:
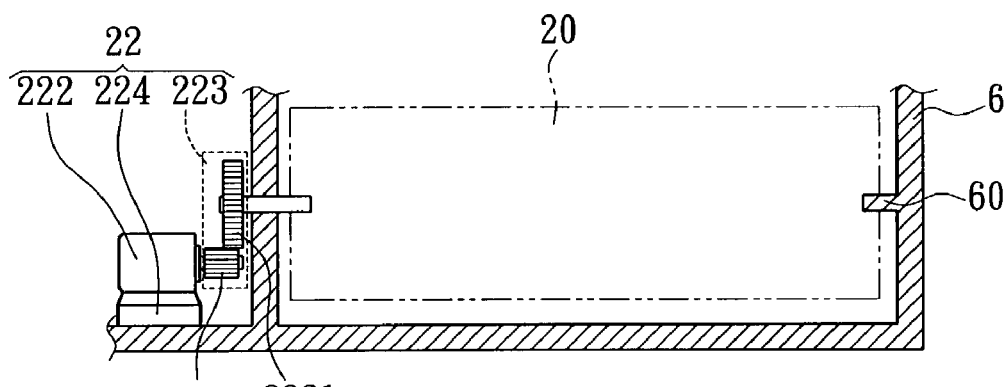
FIG. 4B is a second preferred embodiment of a fixing apparatus of the present invention.
Figure 4C:
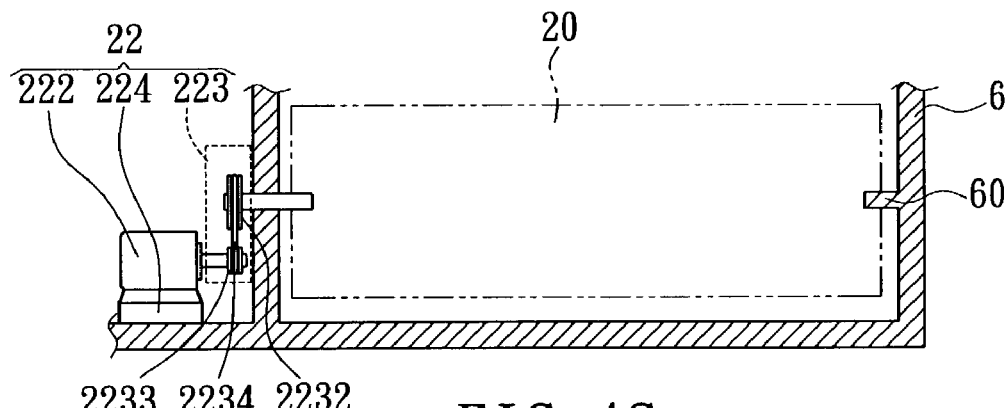
FIG. 4C is a third preferred embodiment of a fixing apparatus of the present invention.

Please refer to FIGS. 4A, 4B and 4C, which are the different preferred embodiments of a fixing apparatus. As shown in FIG. 4A, a fixing apparatus 22 comprises a rotational base 220 and a fixing pin 221; wherein the rotational base 220 is fixed on rotational reflection element 20, and a scale is on rotational base 220 for clearly showing rotational positions of rotational base 220 with rotational reflection element 20. Then, the fixing pin 221 (a screw for this embodiment) goes through rotational base 220 to fix rotational reflection element 20.

Referring to FIG. 4B, the fixing apparatus 22 comprises a power source 222 and a transmission 223; wherein the power source 222 is a power supply to transfer power to rotational reflection element 20 via the transmission 223 assembled a small gear 2230 and a big gear 2231, and a PCB 224 controls power and time of power source 222 to further handle rotational positions of rotational reflection element 20.

As shown in FIG. 4C, the transmission 223 comprises a first driving wheel 2232, a second driving wheel 2233 and a third driving belt 2234, and above connection belongs to a prior art, it may not describe here any further.

Referring to FIG. 5A to FIG. 6B, which are different preferred embodiments of reflection surface sets of rotational reflection element 20.

As shown in above figures, rotational reflection elements 20 and 23 are single elements, which material can be glass, crystal, quartz, acrylic, etc.; or metal, ceramic, non-transparent acrylic, wood, paper, etc.

As shown in FIGS. 5A to 5C, every reflection surface set 200, 201 or 202 of rotational reflection element 20 is an axially extended reflection surface 2001, 2011 or 2021. The reflection surfaces 2001, 2011 and 2021 are formed by three parts of rotational reflection element 20 which are radially and axially cut from an outside surface downward to some place in rotational reflection element 20, such that three predetermined fillisters on rotational reflection element 20 are then generated. Continuously, coating a plating layer on each of the fillisters to become a reflection surface; wherein the three plating layers are numbered 2002, 2012 and 2022, and the three reflection surfaces are numbered 2001, 2011 and 2021. In the preferred embodiment, plating layers 2002, 2012 and 2022 can be made of chromium, silver, etc., or alternatively a sticker with reflection material to stick on the reflection surface. If rotational reflection element 20 is made of good reflection material, the reflection surfaces can be polished to reach reflection function. In the preferred embodiment, no matter what type or how many reflection surfaces, an incident light path always merges with an ejective light path on a point, which means positions of an incident light and an ejective light are totally same.

Figure 6A:
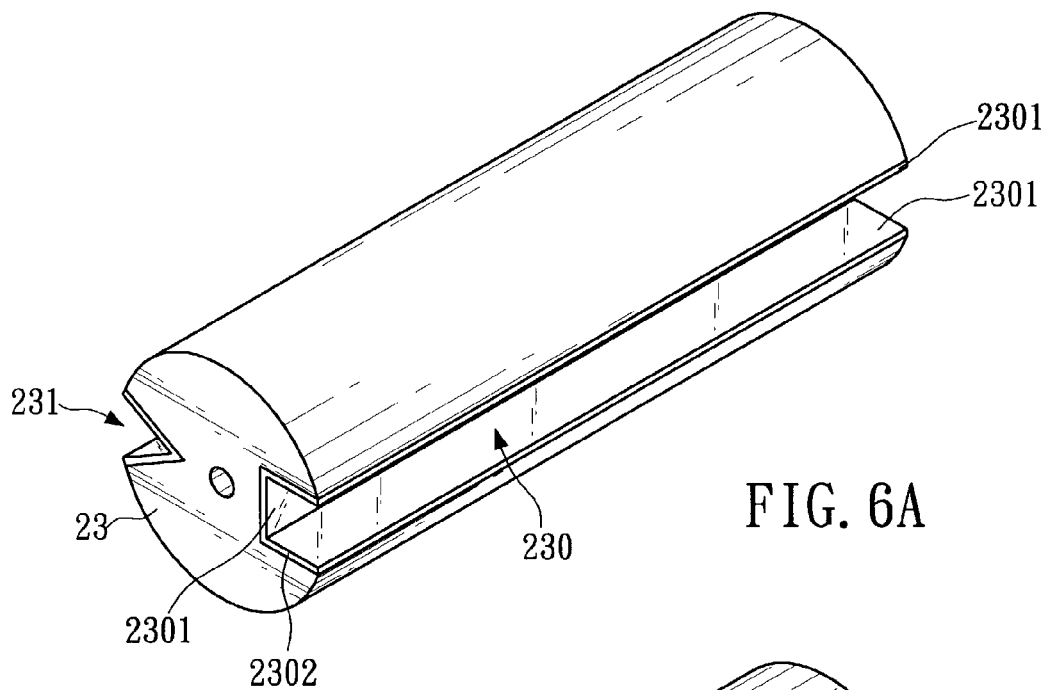
FIG. 6A is a second preferred embodiment of a reflection surface set with three reflection surfaces of a rotational reflection element of the present invention.
Figure 6B:
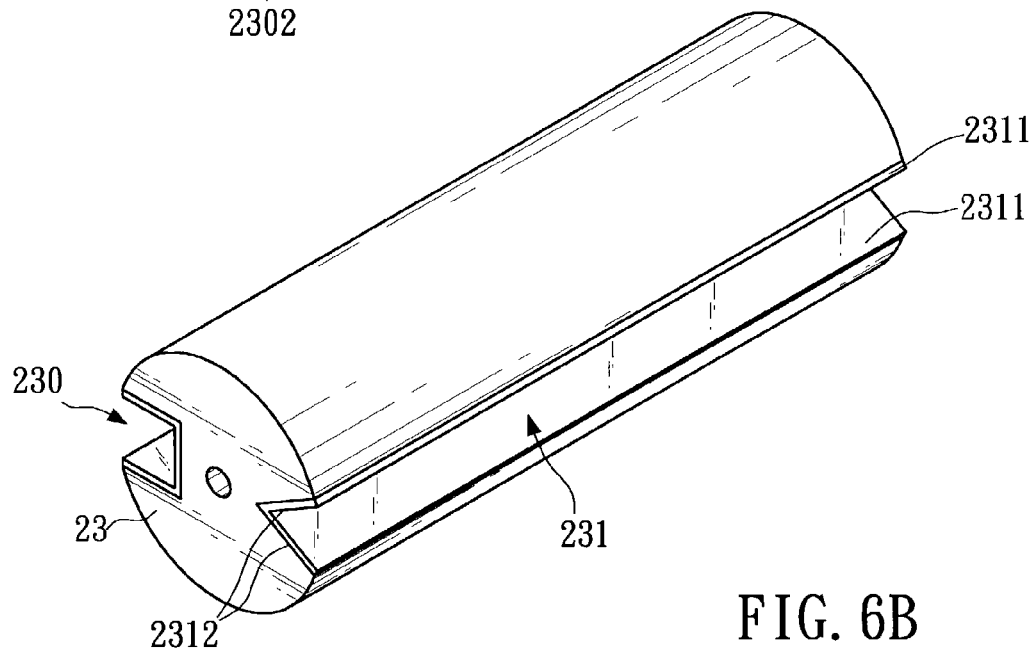
FIG. 6B is a second preferred embodiment of a reflection surface set with three reflection surfaces of a rotational reflection element of the present invention.

Referring to FIGS. 6A and 6B, two reflection surface sets 230 and 231 of a rotational reflection element 23 include a reflection surface 2301 and another reflection surface 2311, respectively. The structure of the rotational reflection element 23 is very similar to the embodiment in FIG. 5, thus no more detailed explanation is provided here.

Figure 7A:
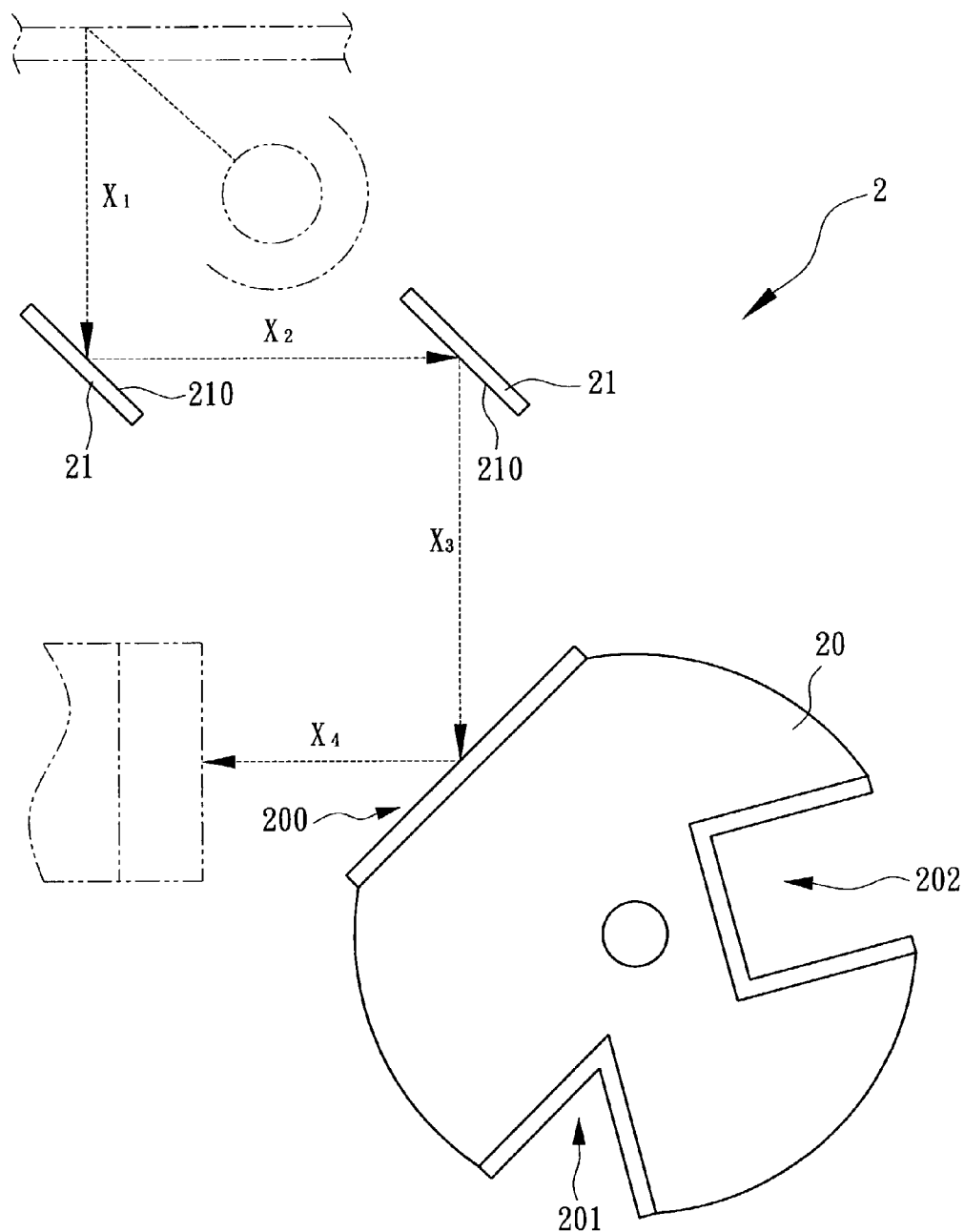
FIG. 7A is an optical length scheme for the first embodiment of rotational reflection element rotating to a reflection surface set with one reflection surface.
Figure 7B:
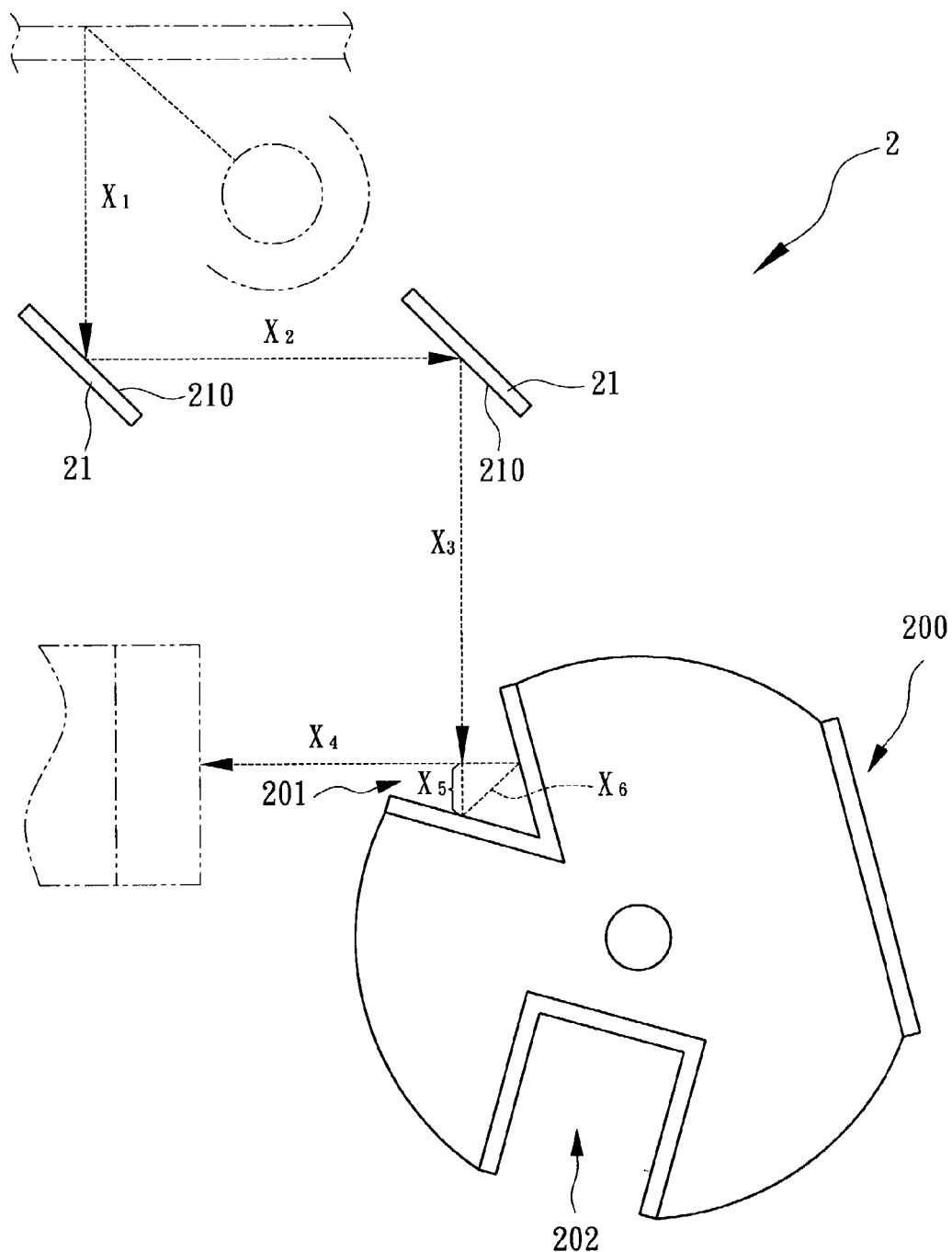
FIG. 7B is an optical length scheme for the first embodiment of rotational reflection element rotating to a reflection surface set with two reflection surfaces.
Figure 7C:
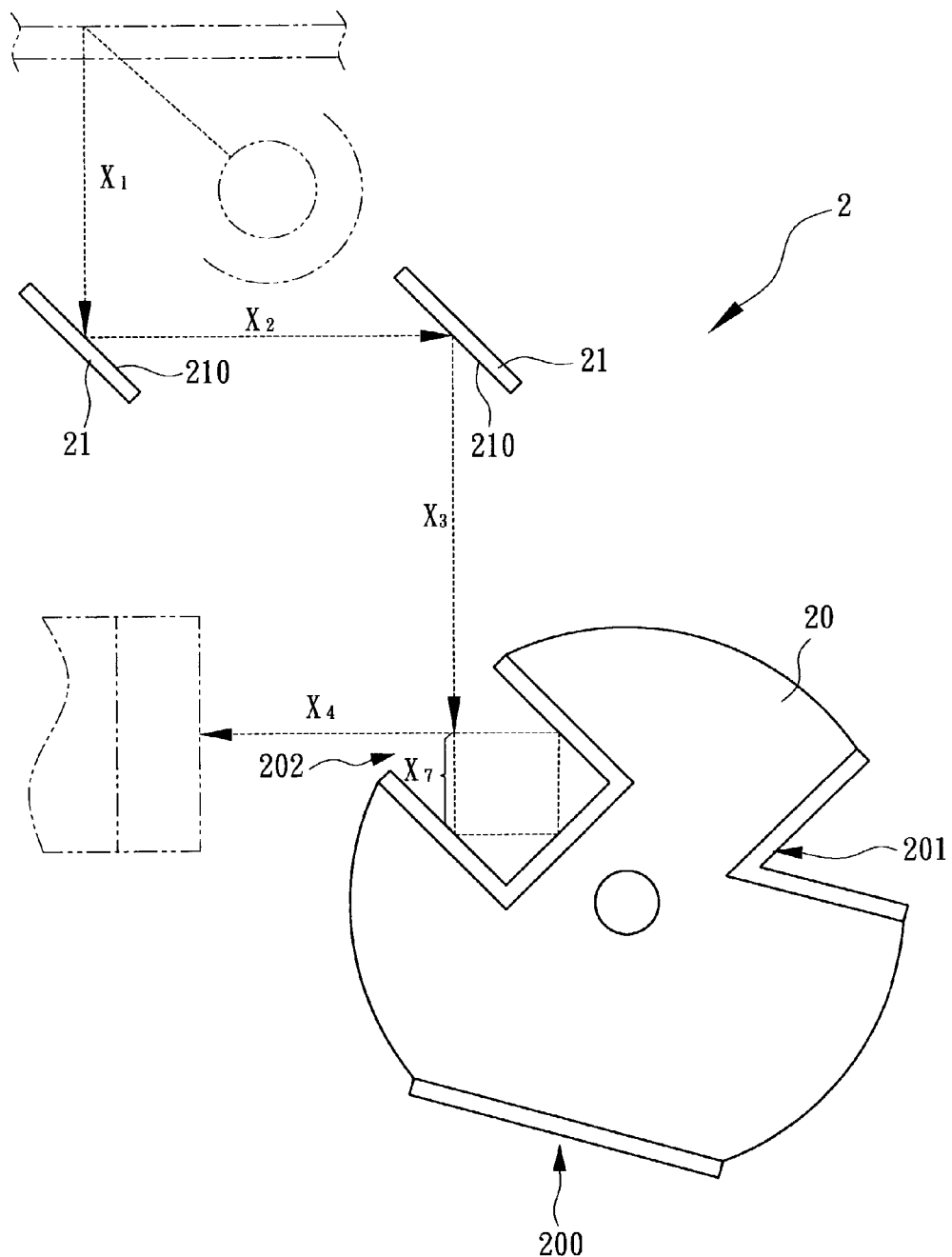
FIG. 7C is an optical length scheme for the first embodiment of rotational reflection element rotating to a reflection surface set with three reflection surfaces.
Figure 8:
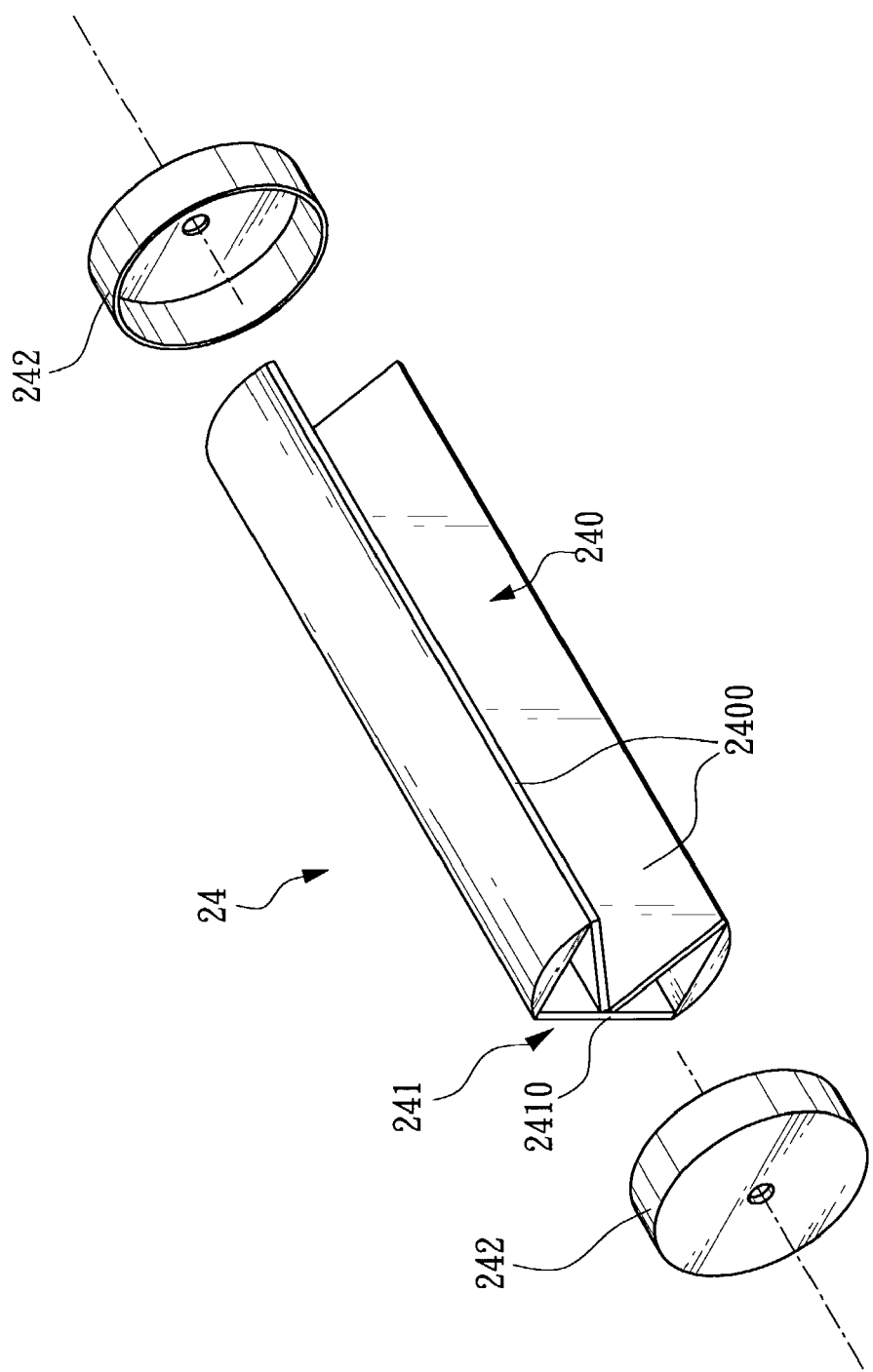
FIG. 8 is a third embodiment of a rotational reflection element of the present invention.

Referring to FIGS. 7A, 7B and 7C, which are the different preferred embodiments for rotational reflection element 20 of light-guide means 2, which may be circulated to different reflection surface sets 200, 201 and 202. Practically, the embodiment is that different reflection surface sets determine different reflection times and total tracks.

As shown in FIG. 7A, the reflection surface set 200 starts working, and it cooperates with fixed reflection elements 21 to assemble light-guide means 2, such that total reflection times is three and total tracks are equal to "X1+X2+X3+X4".

As shown in FIG. 7B, the reflection surface set 201 starts working, and it cooperates with fixed reflection elements 21 to assemble light-guide means 2, such that total reflection times is four and total tracks are equal to "X1+X2+X3+2×X5+X6+X4".

As shown in FIG. 7C, the reflection surface set 202 starts working, and it cooperates with fixed reflection elements 21 to assemble light-guide means 2, such that total reflection times is five and total tracks are equal to "X1+X2+X3+4.times.X7+X4".

Figure 1:
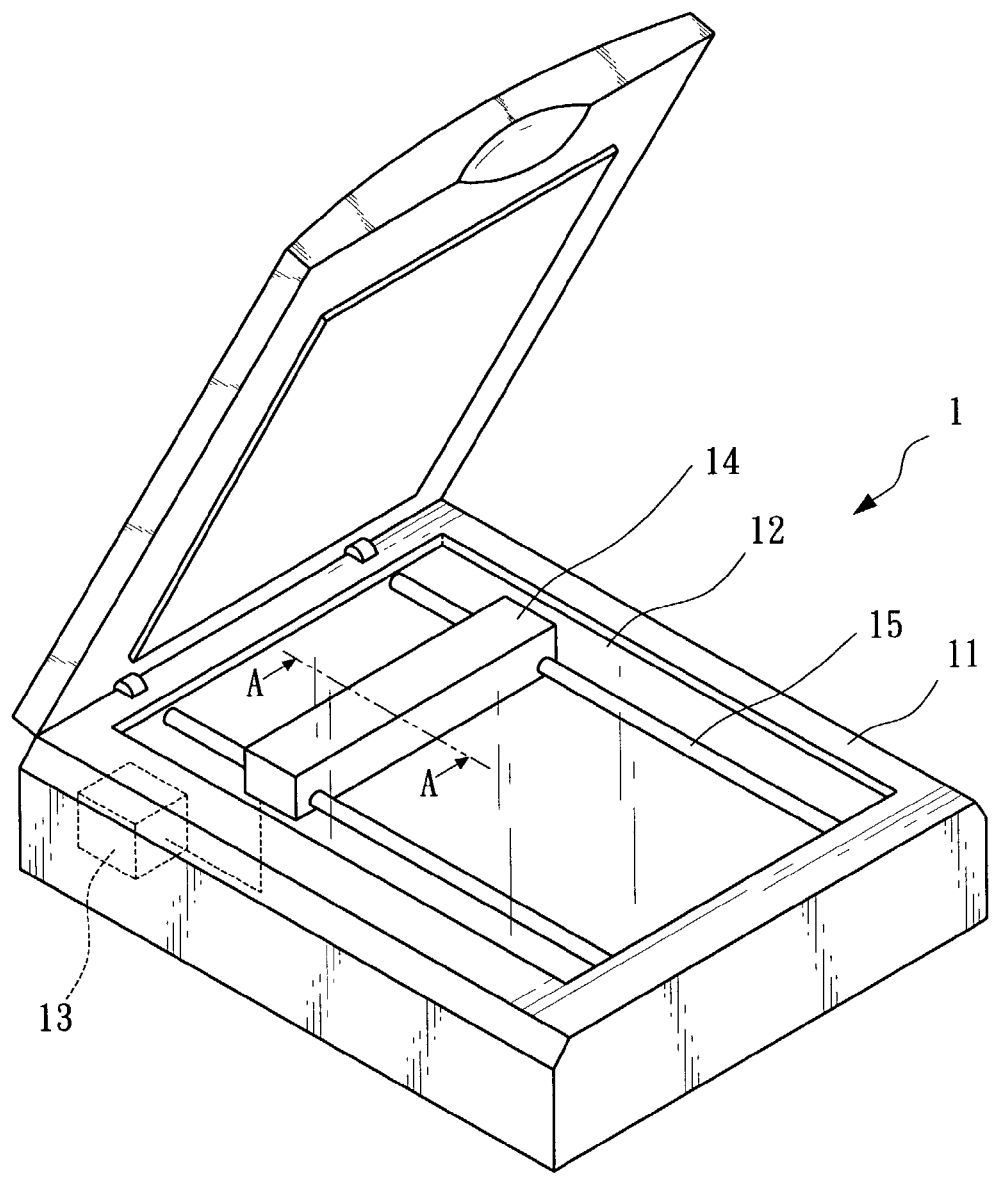
FIG. 1 is a prior art of an optical scanner of flat bed.
Figure 2:
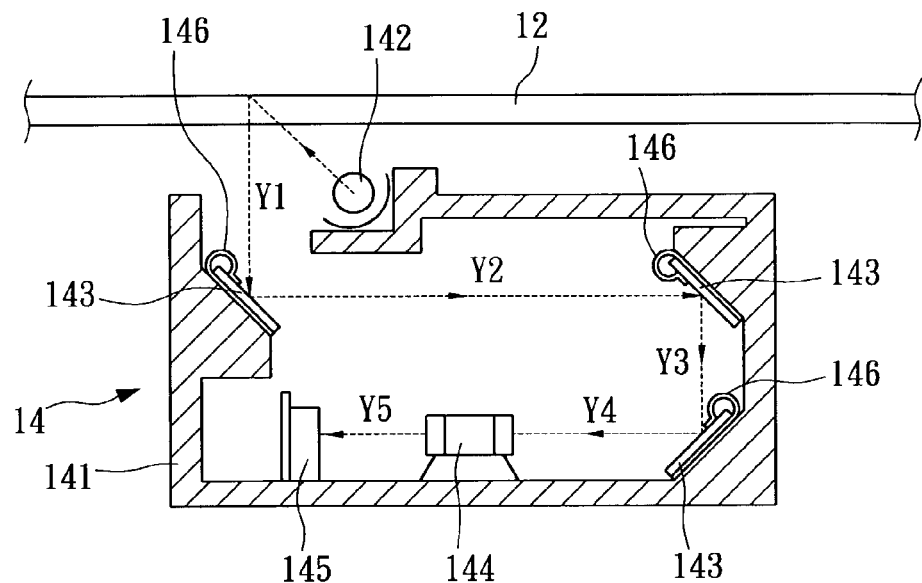
FIG. 2 is a sectional view of A—A section of said optical chassis.

Generally, any skilled person is familiar with that distances X1, X2, X3 and X4 are not easily changed comparatively, which means X1, X2, X3 and X4 are equal to Y1, Y2, Y3 and Y4 separately when FIG. 2 comparing to FIG. 6. Further, total track in FIG. 2 is based on the distances Y2 and Y3, therefore once Y2 and Y3 are extended, a total volume for optical chassis or light-guide means is greatly raised. On the contrary, the present invention which rotational reflection element 20 circulates to different reflection surface sets 200, 201 or 202 to generate different lengths of total tracks. On the other hand, rotational reflection element 20 cooperates with rotational reflection element 23 to vary different lengths of total tracks, which means having flexible cooperation between different rotational reflection elements is a spirit of the present invention.

The method of changeable means of different total tracks includes:

(a) Preparing at least one rotational reflection element 20 or 23, which has reflection surface sets 200, 201, 203 or 230, 231 individually, and each reflection surface set has at least one reflection surface; those reflection surface sets are designed for different lengths of total tracks;

(b) Based on a need of a total track to circulate a certain reflection surface set of a rotational reflection element to a position on a reflection path.

Figure 9:
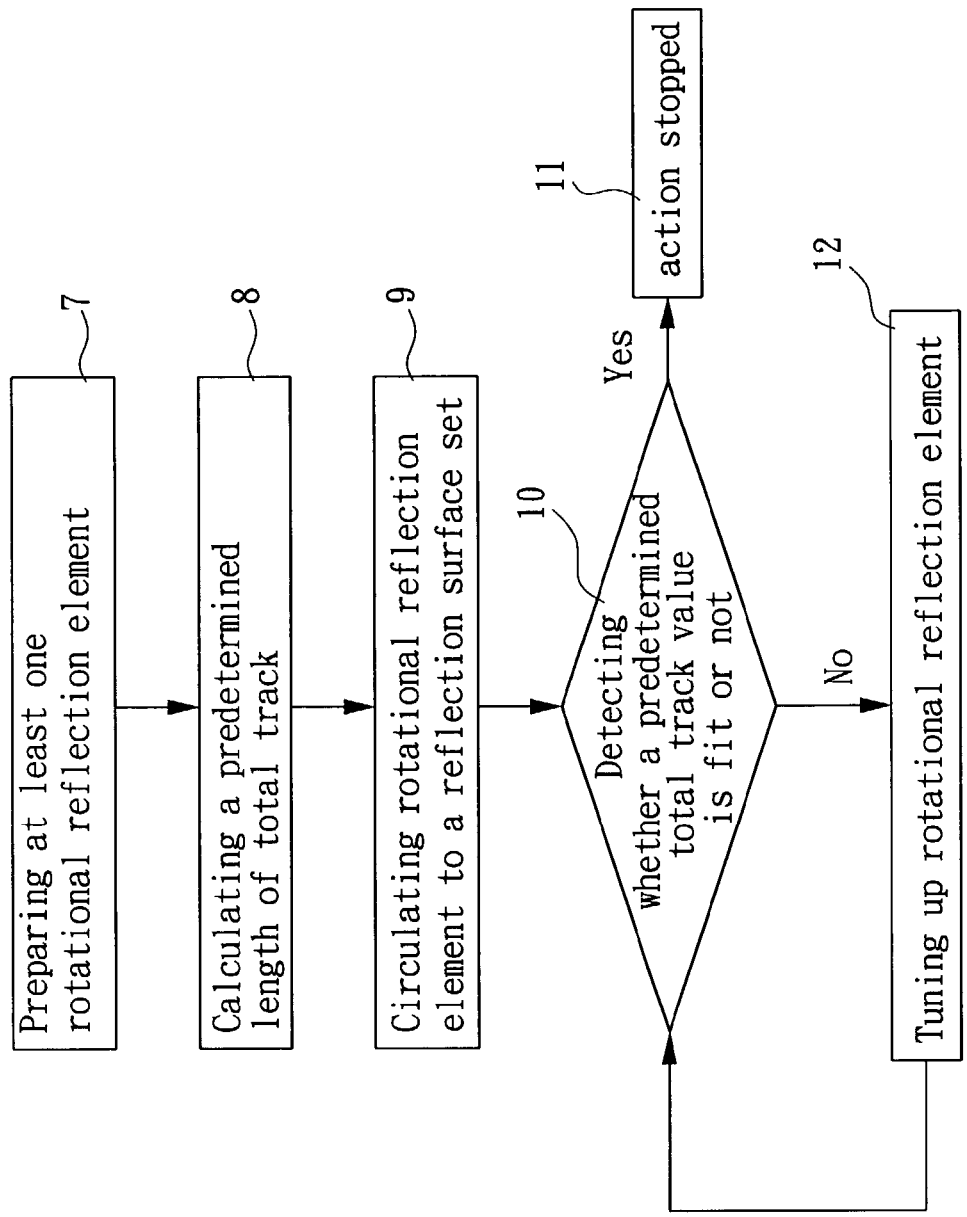
FIG. 9 is a flow chart of a fine tuned optical length of the present invention.

As shown in FIG. 9, which is a flow chart of a fine tuned optical length of the present invention. When setting an optical chassis in a light-guide means, both installation and manufacturing of elements in the optical chassis usually causes tolerances, thus a tune-up is needed when tolerances happen. In prior art, optical chassis needs to be calibrated by accurate instruments; in accordance with the present invention a tune-up method is as following:

(a) Preparing at least one rotational reflection element 7, which has plural reflection surface sets, and each reflection surface set includes at least one reflection surface, the reflection surface sets are for different lengths of total tracks.

(b) Calculating a predetermined length of total track 8 based on dimensions of light-guide means.

(c) Circulating rotational reflection element 7 to a reflection surface set 9, and the reflection surface set 9 is positioned on a reflection path for fitting a total track length.

(d) Step 10 is to detect whether a predetermined total track value is a fit or not; when the predetermined total track value is fit, step 11, action stopped, is terminated. On the other hand, going to step 12, which is that tuning up a rotational reflection element for slightly adjusting an angle between a reflection surface set and a reflection path. When said reflection surface set has one reflection surface and it circulates a θ angle, said reflection path then moves a 2θ angle; the reflection surface set has n reflection surfaces and it circulates a θ angle, the reflection path then moves a $2^n \theta$ θ.sup.n.theta. angle. Therefore, total track length can be tuned up, and a focusing is not affected when a tune-up angle is smaller than 5°. Continuously, repeating to execute step 10 until step 11 can be executed.

While the present invention has been shown and described with reference to preferred embodiments thereof, and in terms of the illustrative drawings, it should not be limited thereby, for instance, the rotational reflection element is not limited by FIG. 5 series, FIG. 6 series and FIG. 9 and is not limited to three reflection surface sets. Comparatively, rotational reflection element may be designed as a pentagon or other figures and the reflection surface sets of a rotational reflection element may be more than three or a round reflection surface. Further, the changeable means for different total tracks is not limited to the optical chassis of optical scanning apparatus, but may be used with other similar apparatus as well, such as copy machine, etc. Thirdly, each reflection surface does not only reflect one time, and it could be that several reflection paths go to a same reflection surface or a reflection surface cannot reflect light under some conditions. Thus, the present invention is infinitely used. However, various possible modification, omission, and alterations could be conceived of by one skilled in the art to the form and the content of any particular embodiment, without departing from the scope and the spirit of the present invention.

The invention is disclosed and is intended to be limited only the scope of the appended claims and its equivalent area.

What is claimed is:

1. An apparatus comprising:
  at least one rotational reflection element capable of rotatably moving and comprising one or more reflection surface sets, wherein said reflection surface set comprises at least one reflection surface,
  a fixing apparatus connected to said rotational reflection element so as to adjust and fix a position of the at least one rotational reflection element; and
  wherein said fixing apparatus comprises:
  one rotational base fixed on said rotational reflection element such that said rotational reflection element is capable of being circulated by adjusting said rotational base; and
  a fixing pin capable of going through said rotational base to fix a position of said rotational reflection element.

2. The apparatus of claim 1, wherein said rotational base comprises a scale for showing rotational positions of said rotational base.

3. The apparatus of claim 1, wherein said fixing pin comprises a screw.

4. A method comprising:
  determining a desired effective optical path length; and
  circulating a rotational reflective element such that a certain reflection surface set is positioned along an optical path, wherein said rotational reflective element comprises a plurality of reflection surface sets, and each reflection surface set having at least one reflection surface; wherein said reflection surface sets are formed such that at least two of said reflection surface sets have different effective optical path lengths.

5. The method of claim 4, wherein said rotational reflection element includes a fixing apparatus capable of adjusting and fixing a rotational position of said rotational reflection element.

6. The method of claim 4, wherein said plurality of reflection surface sets are such that a direction and position of reflected light are substantially the same as a direction and position of incident light.

7. The method of claim 4, wherein said rotational reflection element is a single element.

8. The method of claim 4, wherein the reflection surface of the reflection surface set is formed by a reflection materials on a surface lying in a plane formed at a predetermined angle from a surface of said rotational reflection element.

9. The method of claim 4, wherein the reflection surface set comprises a plurality of reflective glass surfaces.

10. A method comprising:
  calculating a predetermined optical path based on one or more dimensions of a light-guide;
  circulating a rotational reflection element to a reflection surface set such that said reflection surface set is positioned on a reflection path of said light-guide, wherein said rotational reflective element comprises a plurality of reflection surface sets, and each reflection surface set comprises at least one reflection surface; wherein said plurality of reflection surface sets are formed such that at least two of said reflection surface sets have different effective optical path lengths.

11. A method comprising:
  circulating at least one rotational reflection element such that one of one or more reflection surface sets is positioned alone an optical path of a scanner;

wherein said circulating comprises rotating a fixing element coupled to said rotational reflection element; and wherein said fixing element comprises a power source and a fixing pin, wherein said fixing pin is operable to fix a position of said rotational reflection element.

12. The method of claim 11, wherein said power source comprises a motor.

13. The method of claim 12, wherein said fixing element further comprises a transmission.

* * * * *

UNITED STATES PATENT AND TRADEMARK OFFICE
CERTIFICATE OF CORRECTION

| | | |
|---|---|---|
| PATENT NO. | : 7,301,679 B2 | Page 1 of 1 |
| APPLICATION NO. | : 10/174920 | |
| DATED | : November 27, 2007 | |
| INVENTOR(S) | : Yin-Chun Huang | |

It is certified that error appears in the above-identified patent and that said Letters Patent is hereby corrected as shown below:

Title Page 1, Column 2, line 2 item [57] (Abstract):   Delete "sets is" and replace with --sets are--;

Title Page 1, Column 2, line 6 item [57] (Abstract):   Delete "whereinthe" and replace with --wherein the--;

Column 6, lines 46-47 (Claim 8):   Delete "materials" and replace with --material--; and Column 6, line 67 (Claim 11):   Delete "alone" and replace with --along--.

Signed and Sealed this

Ninth Day of November, 2010

David J. Kappos
*Director of the United States Patent and Trademark Office*